(12) United States Patent
Berry

(10) Patent No.: US 7,552,936 B1
(45) Date of Patent: Jun. 30, 2009

(54) TRAILER HITCH MOUNTED MOTORCYCLE CARRIER

(76) Inventor: Clifford E. Berry, 195 W. Central Ave., #144, Brea, CA (US) 92821

( * ) Notice: Subject to any disclaimer, the term of this patent is extended or adjusted under 35 U.S.C. 154(b) by 32 days.

(21) Appl. No.: 11/957,430

(22) Filed: Dec. 15, 2007

(51) Int. Cl.
*B60P 3/06* (2006.01)

(52) U.S. Cl. .................. 280/402; 280/511; 414/462

(58) Field of Classification Search ............ 280/402, 280/511; 414/563, 462, 463
See application file for complete search history.

(56) References Cited

U.S. PATENT DOCUMENTS

| | | | | |
|---|---|---|---|---|
| 3,997,186 A | * | 12/1976 | Pottorff | 280/402 |
| 5,123,802 A | * | 6/1992 | Bell | 414/563 |
| 5,228,712 A | * | 7/1993 | Speier | 280/401 |
| 5,697,629 A | * | 12/1997 | Guild | 280/402 |
| 5,699,985 A | | 12/1997 | Vogel | |
| 5,899,655 A | | 5/1999 | Miller et al. | |
| 5,924,836 A | * | 7/1999 | Kelly | 414/482 |
| 5,984,339 A | * | 11/1999 | Guild | 280/402 |
| 6,186,727 B1 | * | 2/2001 | Hamilton | 414/426 |
| 6,524,056 B1 | * | 2/2003 | Kloster | 414/538 |
| 6,581,954 B2 | * | 6/2003 | Chadwick | 280/491.1 |
| 7,156,403 B2 | * | 1/2007 | Abbott | 280/79.11 |
| 2003/0123964 A1 | * | 7/2003 | Estes | 414/462 |

* cited by examiner

*Primary Examiner*—Paul N Dickson
*Assistant Examiner*—Tashiana Adams
(74) *Attorney, Agent, or Firm*—Kenneth L. Green; Edgar W. Averill, Jr.

(57) ABSTRACT

A motorcycle carrier attaches to a conventional trailer ball and supports a motorcycle front wheel for towing the motorcycle. The carrier resides approximately horizontally and provides a cradle for the motorcycle front wheel holding the front wheel, and motorcycle, in a vertical attitude. The carrier includes a downward facing mouth to place over the trailer ball. The mouth includes an aligning surface for cooperation with a flattened top surface found on known trailer balls. Retainers reside against surfaces of the trailer ball opposite the aligning surface to hold the ball in alignment with the alignment surface and thereby hold the position of the carrier on the trailer ball. Tie down straps may be used to further hold the motorcycle in a vertical attitude.

15 Claims, 5 Drawing Sheets

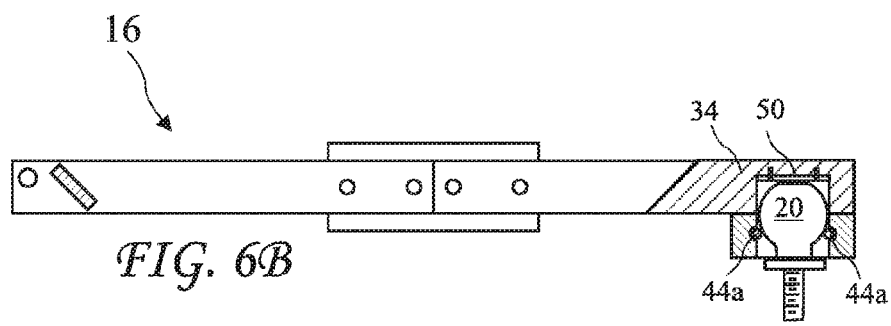
FIG. 6B
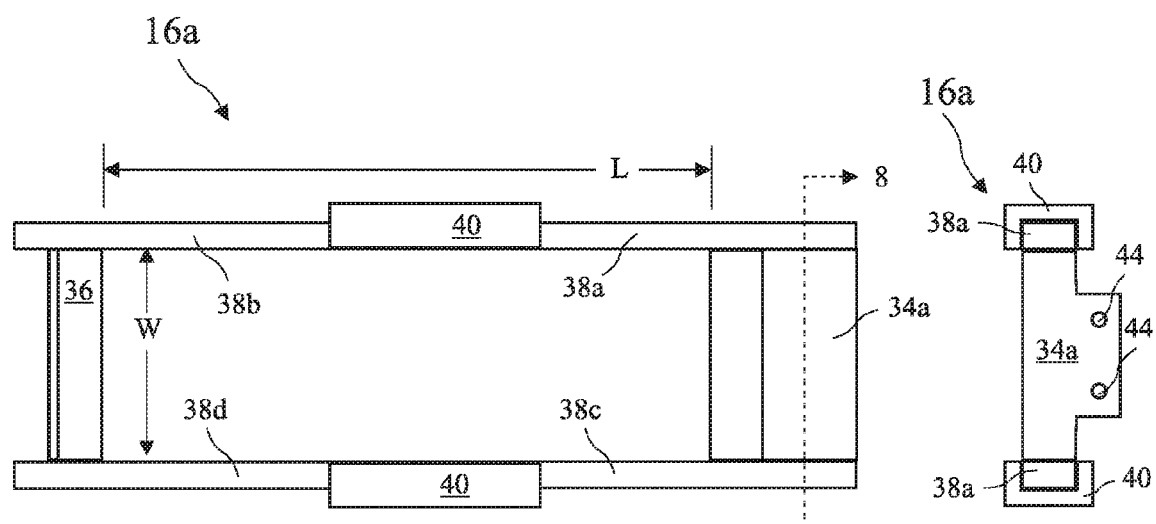
FIG. 7A
FIG. 7B
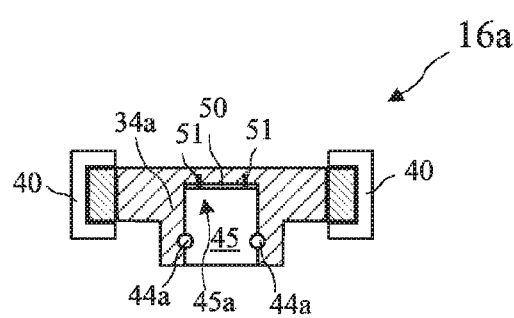
FIG. 8

TRAILER HITCH MOUNTED MOTORCYCLE CARRIER

BACKGROUND OF THE INVENTION

The present invention relates to motorcycle carriers and in particular to trailer hitch mounted motorcycle carriers.

Individual motorcycle riders and members of motorcycle clubs often desire to take weekend or cross country trips. While motorcycle quality and general dependability have dramatically improved in recent years, there remains a risk of breakdown. When such breakdown occurs, the motorcycle rider may be stranded far from repair facilities, food, and lodging. It is also undesirable to leave a motorcycle unprotected on a country road side because of the likelihood of vandalism and theft.

Given the size and weight of motorcycles commonly ridden on cross country trips, it is very difficult to transport such a disabled motorcycle. U.S. Pat. No. 5,699,985 for "Portable Motorcycle Carrier," discloses a carrier which attaches to a receiver trailer hitch. Unfortunately, the carrier described in the '985 patent is far too large to carry on a motorcycle, and the carrier is designed to carry all the weight of a motorcycle, which may have a severe negative impact on the handling of the vehicle it is attached to. Other known motorcycle carriers have the same difficulties.

BRIEF SUMMARY OF THE INVENTION

The present invention addresses the above and other needs by providing a motorcycle carrier which attaches to a conventional trailer ball and supports a motorcycle front wheel for towing the motorcycle. The carrier resides approximately horizontally and provides a cradle for the motorcycle front wheel holding the front wheel and motorcycle, generally with the assistance of two tie down straps, in a vertical attitude. The carrier includes a downward facing mouth to place over the trailer ball. The mouth includes an aligning surface for cooperation with a flattened top surface found on known trailer balls. Retainers reside against surfaces of the trailer ball opposite the aligning surface to hold the ball in alignment with the alignment surface and thereby hold the position of the carrier on the trailer ball.

In accordance with one aspect of the invention, there is provided a motorcycle towing system having a trailer ball and a carrier. The trailer ball is mounted to a tow vehicle and has a diameter D and a flattened top. The carrier is assembleable for use and disassembleable for storage. The carrier includes a nose piece, a rear piece longitudinally spaced apart from the nose piece, and laterally spaced apart side pieces connecting the nose piece to the rear piece and forming a tire opening. The tire opening has an opening width of approximately six inches and an opening length of approximately 15 inches for receiving a portion of a motorcycle front tire and not allowing the front tire to fall through the opening. The nose piece includes a downward facing mouth for receiving the trailer ball. The mouth includes a cylindrical horizontal cross-section, a ceiling at the top of the mouth, a flat hardened insert residing in the ceiling of the mouth to cooperate with the flattened top of the trailer ball, and a base at the bottom of the mouth. Two hardened shoulder bolts reside near the center of the mouth and have smooth shoulders protruding into the mouth at least half the diameter D of the mouth below the ceiling to retain the trailer ball in the mouth. Cooperation of the flat hardened insert with the flattened top of the trailer ball restricts the carrier from overly pitching and rolling on the trailer ball and holds the carrier in a generally horizontal attitude.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 6B shows a cross-sectional side view of the carrier according to the present invention taken along line 6-6 of FIG. 5A with the trailer ball inside a mouth of the carrier.

FIG. 7A is a top view of a second embodiment of the carrier according to the present invention, having lengthwise inserted retainers.

FIG. 7B is an end view of a second embodiment of the carrier having the lengthwise inserted retainers.

FIG. 8 shows a cross-sectional side view of the carrier taken along line 8-8 of FIG. 7A.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
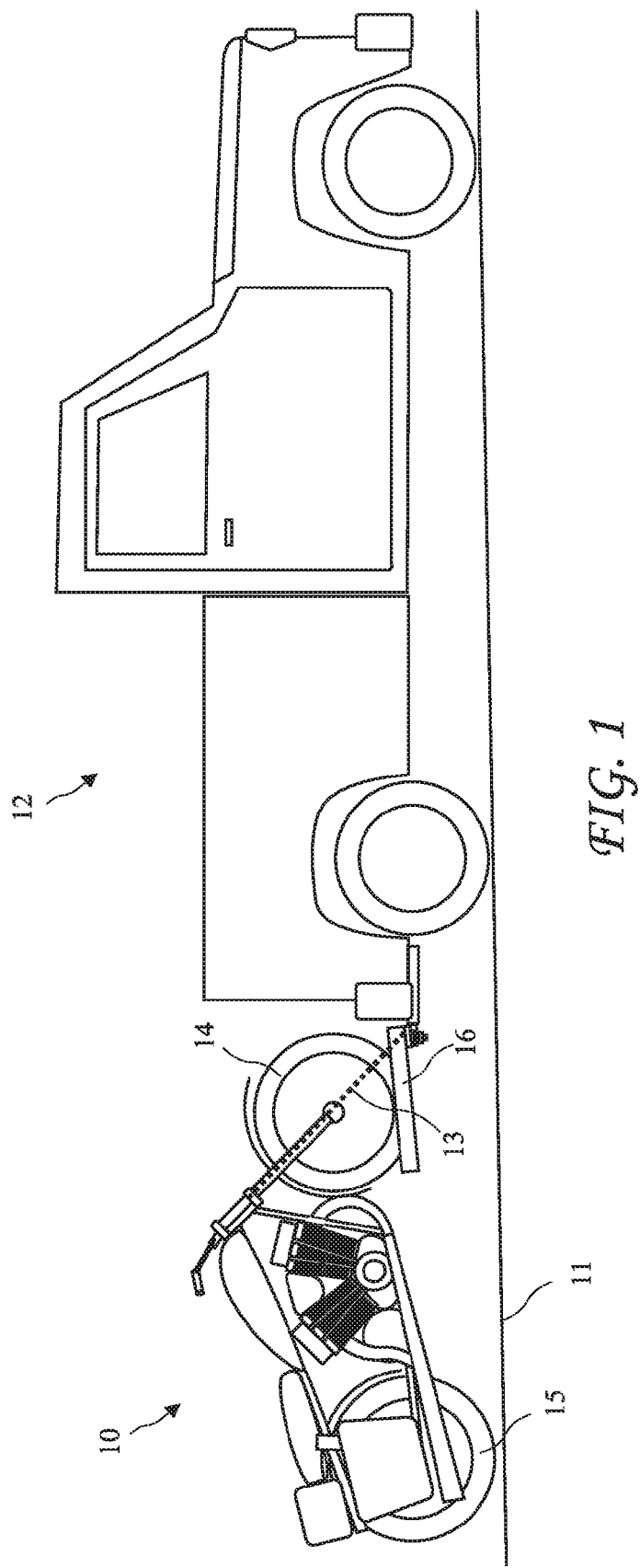
FIG. 1 shows a tow vehicle with a carrier according to the present invention attached to a trailer ball carrying a front tire of a towed motorcycle.

A tow vehicle 12 with a carrier 16 according to the present invention carrying a front tire 14 of a towed motorcycle 10 is shown in FIG. 1. The rear of the motorcycle 10 is supported by the rear wheel 15 rolling on the street 11. Tie down straps 13 are connected between the motorcycle 10 and the tow vehicle 12 to help hold the motorcycle 10 steady while being towed.

Figure 2:
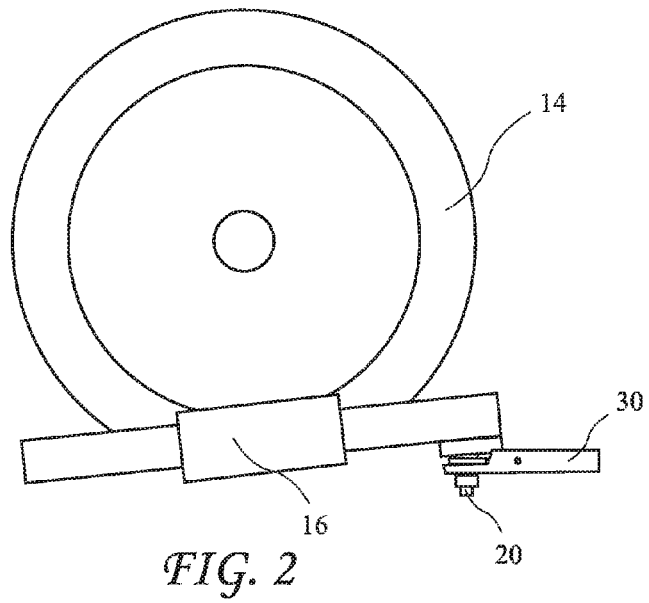
FIG. 2 shows the carrier according to the present invention attached to the trailer ball and carrying the front tire.
Figure 3:
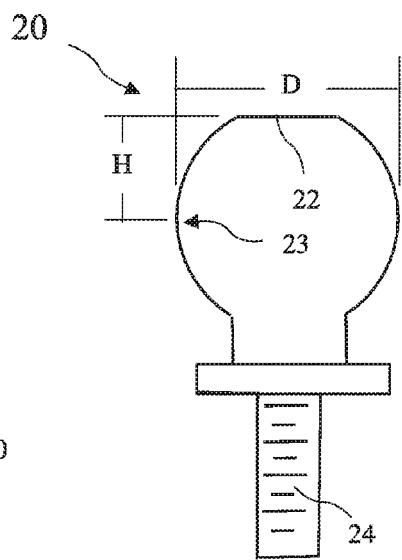
FIG. 3 shows a known trailer ball.

The carrier 16 is shown attached to a trailer ball 20 and carrying the front tire 14 in FIG. 2 and a known trailer ball 20 is shown in FIG. 3. While the trailer ball 20 is shown attached to the ball carrier 30, the trailer ball 20 may also be attached to a tow vehicle bumper, or to any suitably strong structure of the tow vehicle 12. The carrier 16 is seen to be somewhat higher where the carrier 16 is supported by the trailer ball 20. Although the carrier 16 is designed to reside horizontally, it is expected that the weight of the motorcycle 10 will bias the carrier 16 into a tail down attitude. Thus, the carrier 16 is expected to reside generally horizontal, but not perfectly horizontal.

The trailer ball 20 has a spherical portion with a diameter D, which diameter D is commonly approximately two inches, and a flattened top 22. Other trailer ball diameters are known, and while a carrier made for a two inch diameter ball is preferred, any carrier constructed to hold the flattened top 22 of a trailer ball against a flat ceiling of a ball mouth (see FIG. 6A) to restrict the trailer ball from overly pitching and rolling in the mouth, and hold the carrier in a generally horizontal attitude, and made for use with any size trailer ball, is anticipated to come within the scope of the present invention. The trailer ball 20 has a threaded shank 24 for mounting. The vertical distance from a trailer ball waist 23 to the top 22 is a height H.

Figure 4:
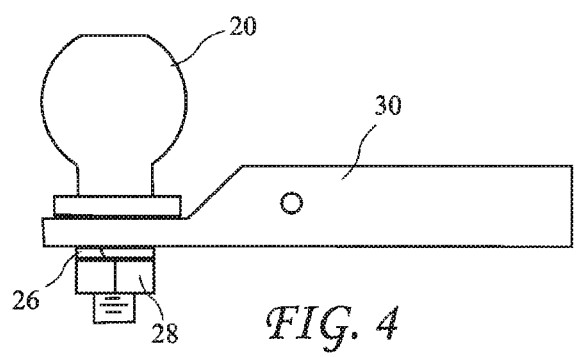
FIG. 4 shows the trailer ball attached to a ball carrier.

The trailer ball 20 is shown attached to a ball carrier 30 in FIG. 4. The trailer ball 20 is secured by a nut 28 and a washer 26 generally resides under the nut 28.

Figure 5A:
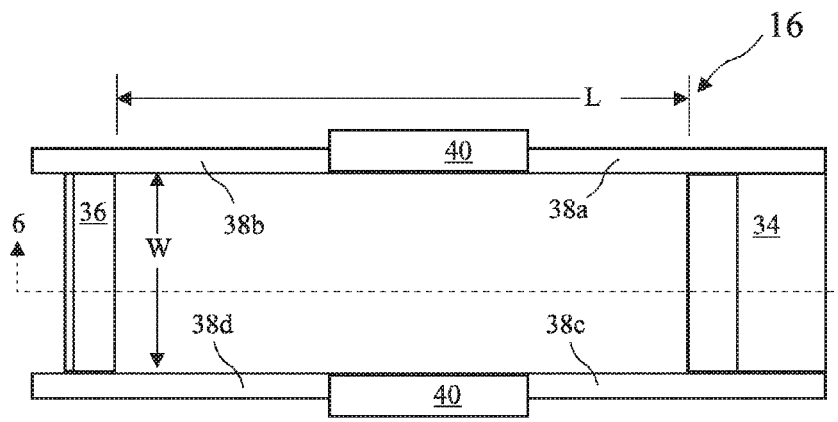
FIG. 5A shows a top view of the carrier according to the present invention.
Figure 5D:
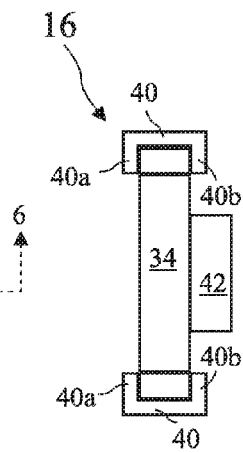
FIG. 5D shows a front end view of the carrier according to the present invention.
Figure 5B:
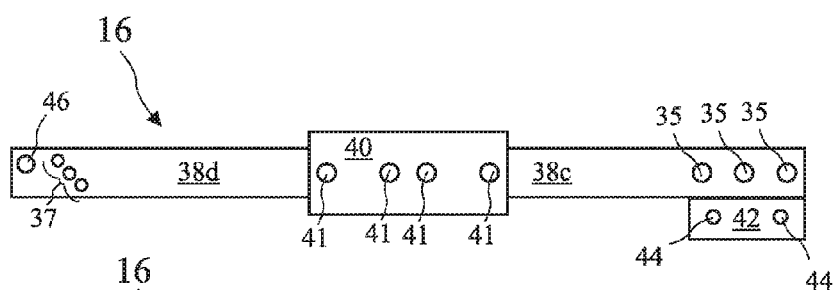
FIG. 5B shows a side view of the carrier according to the present invention.
Figure 5C:
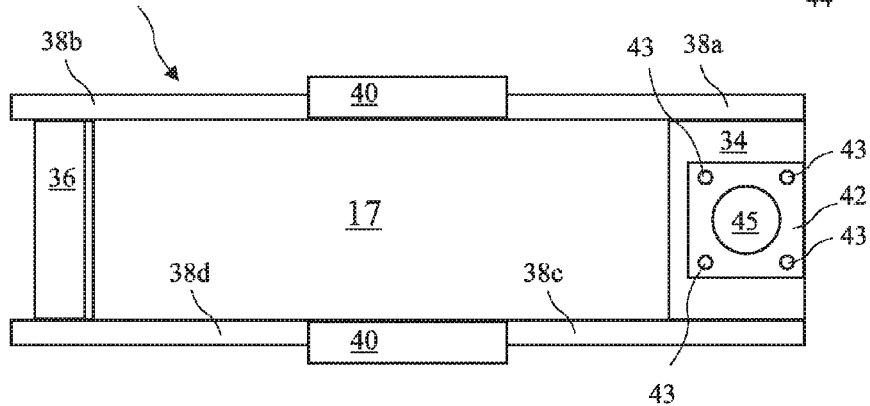
FIG. 5C shows a bottom view of the carrier according to the present invention.

A top view of the carrier 16 according to the present invention is shown in FIG. 5A, a side view of the carrier 16 is shown in FIG. 5B, a bottom view of the carrier 16 is shown in FIG. 5C, and a front end view of the carrier 16 is shown in FIG. 5D. The carrier 16 is made up of a nose piece 34, a rear piece 36, and side pieces formed by left front bar 38a, left rear bar 38b, right front bar 38c, and right rear bar 38d. The bars 38a-38d are disassembleably connected by carrier braces 40 on each side of the carrier 16 preferably using a total of eight screws 41, four on each side. The carrier braces 40 are preferably "C" shaped and include upper and lower edges 40a and 40b which reside over and under the bars 38a-38d to resist miss aligning of the bars when weight is applied by the motorcycle 12.

The nose piece 34 is connected to the bars 38a and 38c by three screws 35 on each side, and may be disassembled from the bars 38a and 38c, but the nose piece 34 and the bars 38a and 38c are generally left as a single unit when stored. The rear piece 36 is connected to the bars 38b and 38d by three screws 37 on each side, and may be disassembled, but is generally also left as a single unit. The nose piece 34, rear piece 36, and side pieces create a tire opening 17 having a length L and a width W. The length L is preferably between approximately 13 inches and approximately 17 inches and more preferably between approximately 15 inches and approximately 17 inches and most preferably approximately 17 inches. While the carrier might be made longer to allow a longer opening length L, the added size of parts and weight may be undesirable. The width W is preferably approximately six inches. The leading edge of the tire opening 17 is formed by a downward and rearward sloping rear edge 34a of the nose piece 34 and the rear edge of the tire opening 17 is formed by a downward and forward sloping edge 36a of the rear piece 36.

Because various motorcycles have various size front tires, the carrier may have a length and width different from the preferred length and width. Any carrier constructed to hold the flattened top of a trailer ball against a flat ceiling of a ball mouth to restrict the trailer ball from overly pitching and rolling in the mouth and holds the carrier in a generally horizontal attitude is intended to come within the scope of the present invention.

The mouth 45 extends through a mouth extension 42 attached to the bottom of the nose piece 34 by four screws 43. Ramp pivot openings 46 are provided at the rear of the side pieces 38b and 38d for attachment of a ramp 60 (see FIGS. 9, 10A, and 10B). In other embodiments the nose piece 34 and the mouth extension 42 are a single piece. The mouth 45 generally has the shape of a vertical cylinder, but may have some rounding of the edge of the ceiling 45a as long as a flat portion remains to contact the flattened top 22 of the ball 20.

Figure 6A:
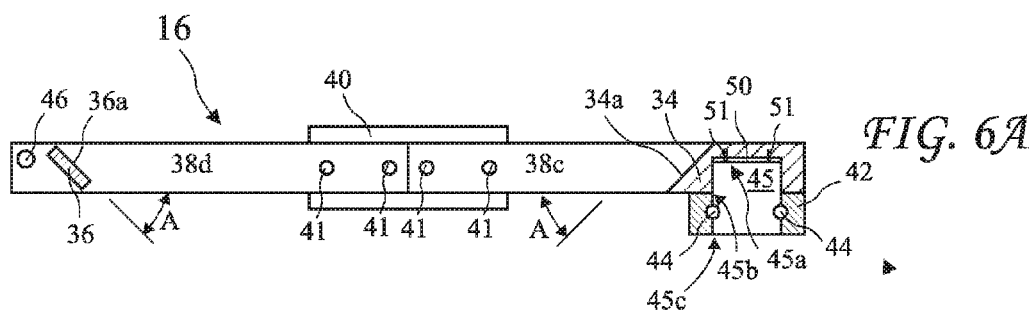
FIG. 6A shows a cross-sectional side view of the carrier according to the present invention taken along line 6-6 of FIG. 5A.

A cross-sectional side view of the carrier 16 taken along line 6-6 of FIG. 5A is shown in FIG. 6A. The carrier 16 is preferably made of a light weight material such as aluminum, and a flat hardened insert 50 resides in a ceiling 45a of the mouth 45. While the bottom surface of the insert 50 has a required shape for cooperation with the trailer ball 20, the top surface of the insert 50 may have any shape suitable to position the insert 50 in the ceiling 45a of the mouth 45. The insert 50 is preferably attached by two screws 51. Two retainer passages 44 reside towards the bottom of the mouth 45. The mouth 45 has a mouth base 45c and a mouth center 45b between the mouth base 45c and the ceiling 45a.

A cross-sectional side view of the carrier 16 taken along line 6-6 of FIG. 5A with the trailer ball 20 inside a mouth 45 of the carrier 16 is shown in FIG. 6B. The flattened top 22 (see FIG. 3) of the trailer ball 20 resides against the ceiling 45a of the mouth 45. Retainers 44a reside in the retainer passages 44 under the waist 23 (see FIG. 3) of the trailer ball 20. The retainers 44a thus retain the ball 20 in the mouth 45 and in particular the flattened top 22 of the ball 20 against the ceiling 45a and thereby resist pitch or roll of the carrier 16 with respect to the ball 20 and hold the carrier 16 in a generally horizontal attitude.

A top view of a second embodiment of the carrier 16a according to the present invention having lengthwise inserted retainers is shown in FIG. 7A, an end view of a second embodiment of the carrier 16a having the lengthwise inserted retainers is shown in FIG. 7B, and a cross-sectional side view of the carrier 16a taken along line 8-8 of FIG. 7A is shown in FIG. 8. The second embodiment of the carrier 16a is very similar to the carrier 16 with the differences being that the nose piece 34a of the carrier 16a includes a mouth extension while the mouth extension 42 is bolted or otherwise attached to the nose piece 34 of the carrier 16, and the retainer 44a resides along the length of the carrier 16a not across the width as in the carrier 16. Either embodiment of the carrier may include a single piece or multi piece nose piece, and a carrier constructed in either manner is intended to come within the scope of the present invention.

The carrier 16a further includes the lengthwise running retainers 44a. The positioning of the retainers 44a in the carrier 16a is otherwise similar to the positioning for the carrier 16, and any carrier including retainers residing below the waist 23 of a trailer ball to retain the flattened top 22 of the trailer ball 20 against the ceiling 45a and resist pitch or roll of the carrier with respect to the ball and hold the carrier in a generally horizontal attitude, is intended to come within the scope of the present invention.

Figure 9:
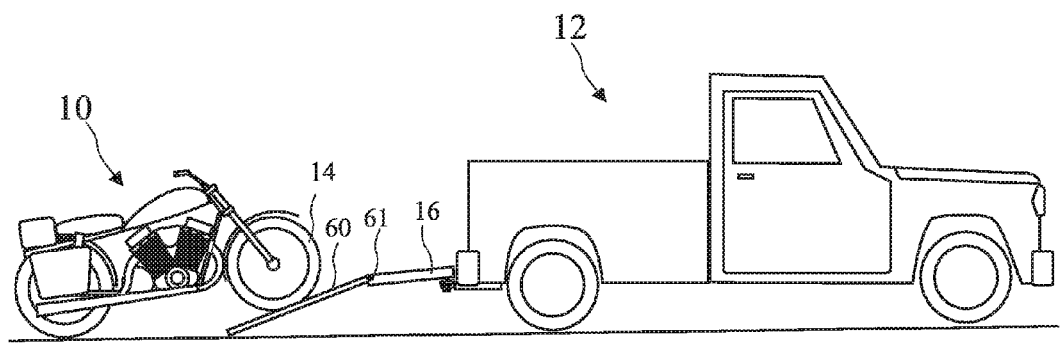
FIG. 9 shows the motorcycle starting up a ramp according to the present invention.
Figure 10A:
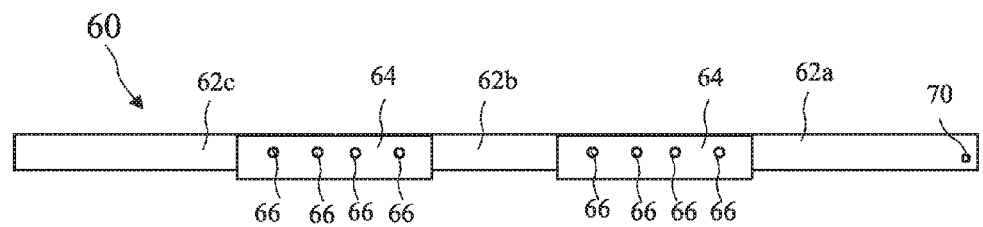
FIG. 10A shows a side view of the ramp.
Figure 10B:
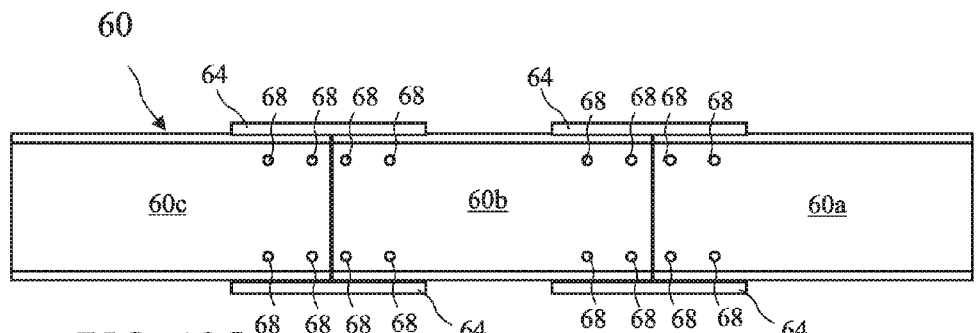
FIG. 10B shows a top view of the ramp.

The motorcycle 10 starting up a ramp 60 according to the present invention is shown in FIG. 9, a side view of the ramp 60 is shown in FIG. 1A, and a top view of the ramp 60 is shown in FIG. 10B. The ramp 60 is attached to the rear of the carrier 16 by ramp fasteners 61 engaging the ramp pivot opening 46 (see FIG. 5B) and ramp attaching features 70 on a forward end of the ramp 60. The fasteners 61 are preferably shoulder bolts to allow the ramp 60 to freely pivot about the fasteners 61. The ramp 60 is detachably attachable to the carrier 16 to facilitate positioning the front tire 14 in the tire opening 17. The ramp 60 preferably comprises three approximately 12 inch long sections 60a, 60b, and 60c which join end to end to form an approximately 36 inch long ramp 60. The sections 60a, 60b, and 60c are preferably joined by pairs of ramp braces 64 on opposite sides of the ramp 60. The sections 60a, 60b, and 60c are shallow channels approximately six inches wide and approximately one inch deep. The braces 64 have an "L" shaped cross-section and reside on the outside and under the sections 60a, 60b, and 60c. Each of the ramp braces 64 is attached to the sections 60a, 60b, and 60c by four horizontal machine screws 66 and four vertical screws 68.

While the invention herein disclosed has been described by means of specific embodiments and applications thereof, numerous modifications and variations could be made thereto by those skilled in the art without departing from the scope of the invention set forth in the claims.

I claim:

1. A motorcycle carrier comprising:
    a nose piece;
    a rear piece longitudinally spaced apart from the nose piece;
    laterally spaced apart side pieces connecting the nose piece to the rear piece and forming a tire opening with an opening width and an opening length selected to receive a portion of a motorcycle front tire and to not allow the front tire to fall through the opening;
    a downward facing mouth in the nose piece for receiving a trailer ball having a flattened top surface and a diameter D, the mouth having:
        a cylindrical shape;
        a ceiling at the top of the mouth;
        a ceiling flat portion surrounding a center of the ceiling;
        a base at the bottom of the mouth; and
        a center of the mouth between the base and the ceiling;
    at least one retainer residing near the center of the mouth and protruding into the mouth at least half the diameter D below the ceiling to retain the trailer ball residing in the mouth so that cooperation of the ceiling flat portion with the flattened top of the trailer ball resist pitching and rolling of the trailer ball in the mouth and holds the carrier in a generally horizontal attitude.

2. The motorcycle carrier of claim 1, wherein the ceiling flat portion includes a flat hardened insert residing in the ceiling of the mouth to cooperate with the flattened top of the trailer ball to resist pitching and rolling of the trailer ball in the mouth and holds the carrier in a generally horizontal attitude.

3. The motorcycle carrier of claim 1, wherein the carrier may be assembled for use and disassembled for storage.

4. The motorcycle carrier of claim 3, wherein each of the two side pieces comprise two side piece sections joined at section ends and the carrier may be assembled for use and disassembled into two parts for storage by disjoining the side pieces.

5. The motorcycle carrier of claim 1, wherein:
    the at least one retainer comprises two bolts inserted through a portion of the nose piece on opposite sides of the mouth; and
    the two bolts partially overlap into the mouth.

6. The motorcycle carrier of claim 5, wherein the bolts are partially threaded and unthreaded portions of the bolt overlap into the mouth.

7. The motorcycle carrier of claim 6, wherein the bolts are shoulder bolts and unthreaded portions of the shoulders overlap into the mouth.

8. The motorcycle carrier of claim 7, wherein the shoulder bolts are hardened shoulder bolts.

9. The motorcycle carrier of claim 8, wherein the hardened shoulder bolts have ⅜ inch hardened steel shoulders.

10. The motorcycle carrier of claim 1, wherein the tire opening is approximately six inches wide and between approximately 13 inches and approximately 17 inches long.

11. The motorcycle carrier of claim 10, wherein the nose piece has a downwardly and inwardly sloping front inside edge forming a front edge of the tire opening and the rear piece has a downwardly and inwardly sloping rear inside edge forming a rear edge of the tire opening.

12. The motorcycle carrier of claim 1, further including a ramp, the ramp assembleable for use and disassembleable into short sections for storage.

13. The motorcycle carrier of claim 12, wherein the short sections comprise three short sections, each short section approximately twelve inches long, the short sections assembleable at common ends and the assembled ramp pivotally attachable to the rear piece of the carrier for rolling a motorcycle front tire onto the carrier.

14. A motorcycle towing system comprising:
    a trailer ball mounted to a tow vehicle, the trailer ball having a diameter D and a flattened top;
    a carrier assembleable for use and disassembleable for storage, the assembled carrier comprising;
    a nose piece;
    a rear piece longitudinally spaced apart from the nose piece;
    laterally spaced apart side pieces connecting the nose piece to the rear piece and forming a tire opening with an opening length between approximately thirteen inches and approximately seventeen inches selected to receive a portion of a motorcycle front tire and to not allow the front tire to fall through the opening;
    a downward facing mouth in the nose piece for receiving the trailer ball, the mouth having:
        a cylindrical shape;
        a ceiling at the top of the mouth;
        a flat hardened insert residing in the ceiling of the mouth to cooperate with the flattened top of the trailer ball;
        a base at the bottom of the mouth; and
        a center of the mouth between the base and the ceiling;
    two hardened bolts residing near the center of the mouth and protruding into the mouth at least half the diameter D below the ceiling to retain the trailer ball in the mouth so that cooperation of the flat hardened insert with the flattened top of the trailer ball resist pitching and rolling of the trailer ball in the mouth and holds the carrier in a generally horizontal attitude.

15. A motorcycle towing system comprising:
    a trailer ball mounted to a tow vehicle, the trailer ball having a waist, a flattened top, and a height H from the waist of the trailer ball to the flattened top of the trailer ball;
    a carrier assembleable for use and disassembleable for storage, the assembled carrier comprising;
    a nose piece;
    a rear piece longitudinally spaced apart from the nose piece;
    laterally spaced apart side pieces connecting the nose piece to the rear piece and forming a tire opening with an opening width of approximately six inches and an opening length of approximately 17 inches for receiving a portion of a motorcycle front tire and not allowing the front tire to fall through the opening;
    a downward facing mouth in the nose piece for receiving the trailer ball, the mouth having:
        a cylindrical shape;
        a ceiling at the top of the mouth;
        a flat hardened insert residing in the ceiling of the mouth to cooperate with the flattened top of the trailer ball;

a base at the bottom of the mouth; and a center of the mouth between the base and the ceiling;

two hardened shoulder bolts residing near the center of the mouth and having smooth shoulders protruding into the mouth slightly more than the height H below the ceiling to retain the trailer ball in the mouth so that cooperation of the flat hardened insert with the flattened top of the trailer ball resists pitching and rolling of the carrier on the trailer ball and holds the carrier in a generally horizontal attitude.

\* \* \* \* \*